United States Patent
Li et al.

(10) Patent No.: US 11,055,610 B2
(45) Date of Patent: Jul. 6, 2021

(54) CIRCUIT FOR CMOS BASED RESISTIVE PROCESSING UNIT

(71) Applicant: International Business Machines Corporation, Armonk, NY (US)

(72) Inventors: Yulong Li, Hartsdale, NY (US); Paul Solomon, Yorktown Heights, NY (US); Effendi Leobandung, Stormville, NY (US); Chun-Chen Yeh, Danbury, CT (US); Seyoung Kim, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 15/639,255

(22) Filed: Jun. 30, 2017

(65) Prior Publication Data

US 2019/0005381 A1  Jan. 3, 2019

(51) Int. Cl.
  *G06N 3/063* (2006.01)
  *G06N 3/08* (2006.01)
  *G06F 17/16* (2006.01)

(52) U.S. Cl.
  CPC .......... *G06N 3/0635* (2013.01); *G06F 17/16* (2013.01); *G06N 3/08* (2013.01); *G06N 3/084* (2013.01)

(58) Field of Classification Search
  CPC .. G05B 13/027; G05B 13/0285; G05B 17/02; G06N 3/08; F16F 15/02
  USPC .......................................................... 706/23
  See application file for complete search history.

(56) References Cited

PUBLICATIONS

Kim et al.—"Analog CMOS-based Resistive Processing Unit for Deep Neural Network Training"—Jun. 20, 2017—https://arxiv.org/abs/1706.06620 (Year: 2017).*
Institute of Microelectronic Systems—"5. CMOS Inverter"—Jan. 10, 2017—http://www.csit-sun.pub.ro/courses/vlsi/VLSI_Darmstad/www.microelectronic.e-technik.tu-darmstadt.de/lectures/winter/vlsi/vorlesung_pdf/chap05.pdf (Year: 2017).*
Prof. A. Mason—"CMOS Inverter: DC Analysis"—Nov. 23, 2016—https://web.archive.org/web/20161123044414/https://www.egr.msu.edu/classes/ece410/mason/files/Ch7.pdf (Year: 2016).*
EECS Berkeley EDU—"The CMOS Inverter"—Sep. 6, 1999—http://bwrcs.eecs.berkeley.edu/Classes/icdesign/ee141_f01/Notes/chapter5.pdf (Year: 1999).*

(Continued)

*Primary Examiner* — Viker A Lamardo
(74) *Attorney, Agent, or Firm* — Scully, Scott, Murphy & Presser, P.C.; L. Jeffrey Kelly

(57) ABSTRACT

A CMOS-based resistive processing unit (RPU) for a neural network. The RPU includes a capacitor device configured to store a charge representing a weight value associated with a neural network circuit operation. A current source Field Effect Transistor (FET) device is operatively connected to the capacitor device for increasing a charge on the capacitor. A current sink FET device operatively connected to the capacitor device is configured for decreasing the stored capacitor charge. An analog weight update circuit receives one or more update signals generated in conjunction with the neural network circuit operation, the analog weight update circuit controlling the current source FET device and the current sink FET device to provide either a determined amount of current to increase the stored charge on the capacitor device, or sink a determined amount of current to decrease the stored charge on the capacitor device.

14 Claims, 9 Drawing Sheets

(56) References Cited

PUBLICATIONS

Gokemen et al.—"Acceleration of Deep Neural Network Training with Resistive Cross-Point Devices: Design Considerations"—Jul. 21, 2016—https://www.frontiersin.org/articles/10.3389/fnins.2016.00333/full (Year: 2016).*

Gokmen et al., "Acceleration of Deep Neural Network Training with Resistive Cross-Point Devices: Design Considerations", Frontiers in Neuroscience, www.frontiersin.org, Jul. 2016, vol. 10, Article 333, Jul. 21, 2016, pp. 1-13.

Kim et al., "Circuit Methodology for Highly Linear and Symmetric Resistive Processing Unit", U.S. Appl. No. 15/335,171, filed Oct. 26, 2016.

List of IBM Patents or Patent Applications Treated As Related.

* cited by examiner

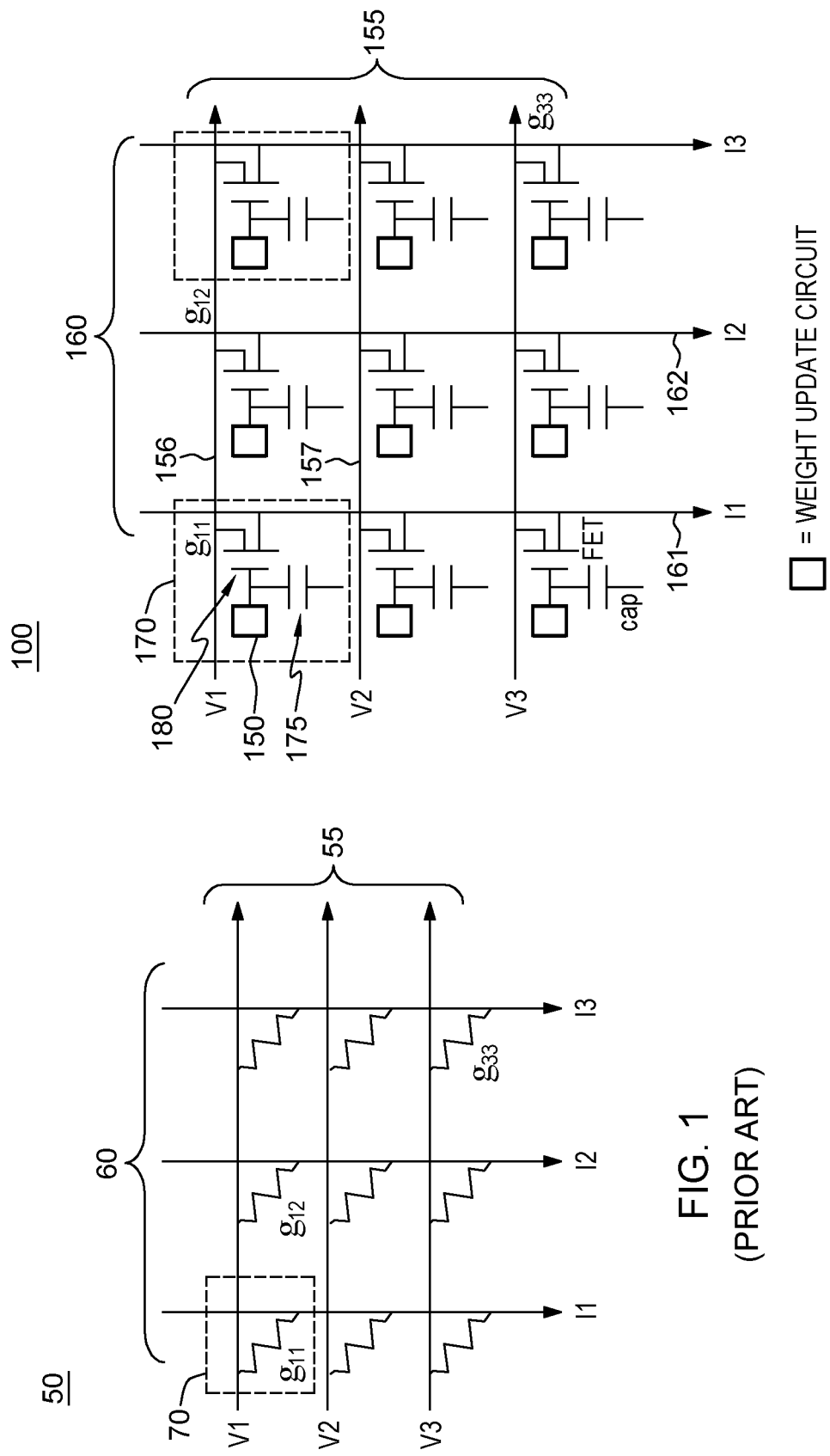

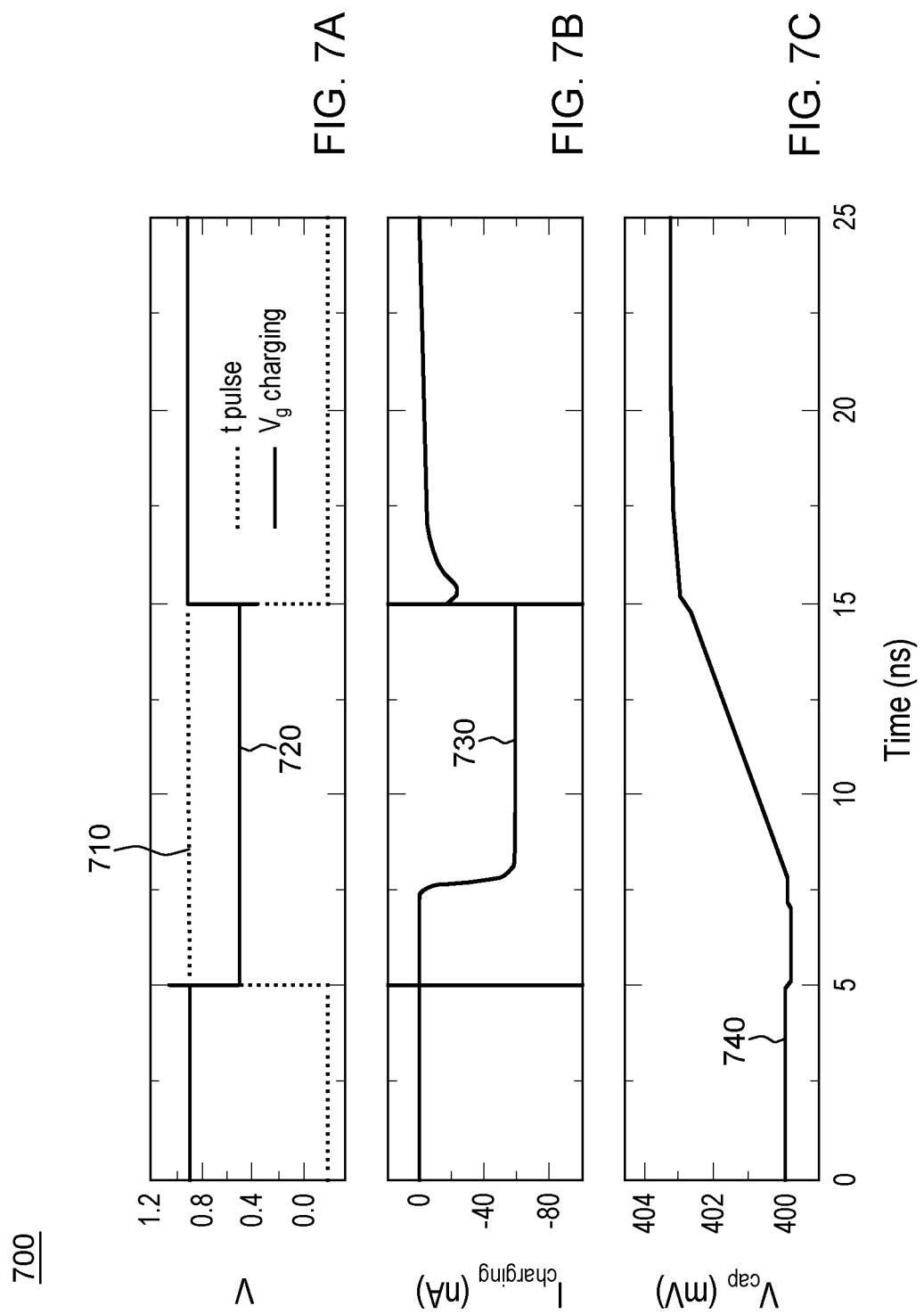

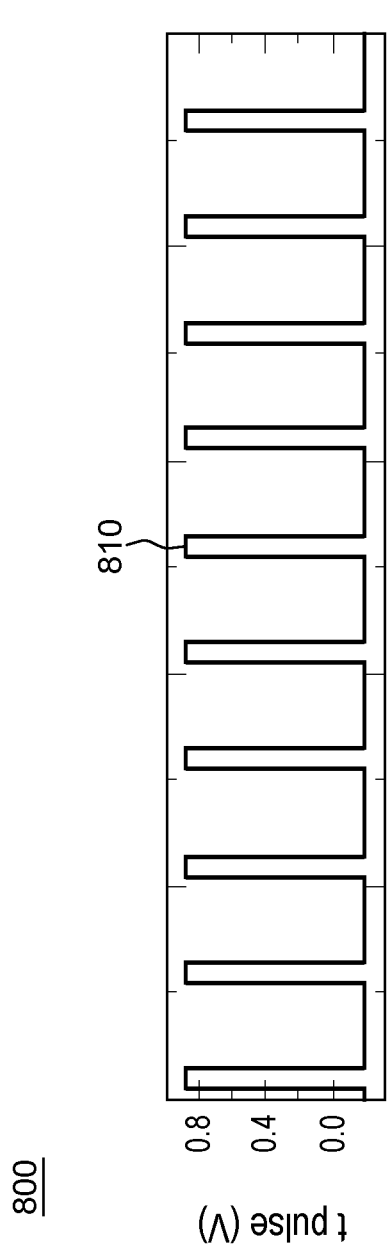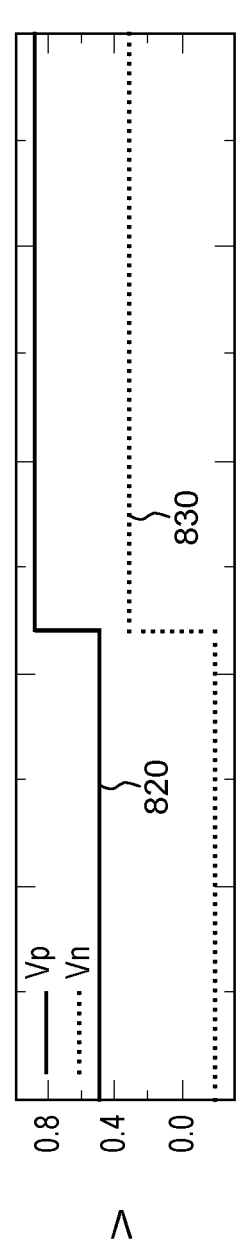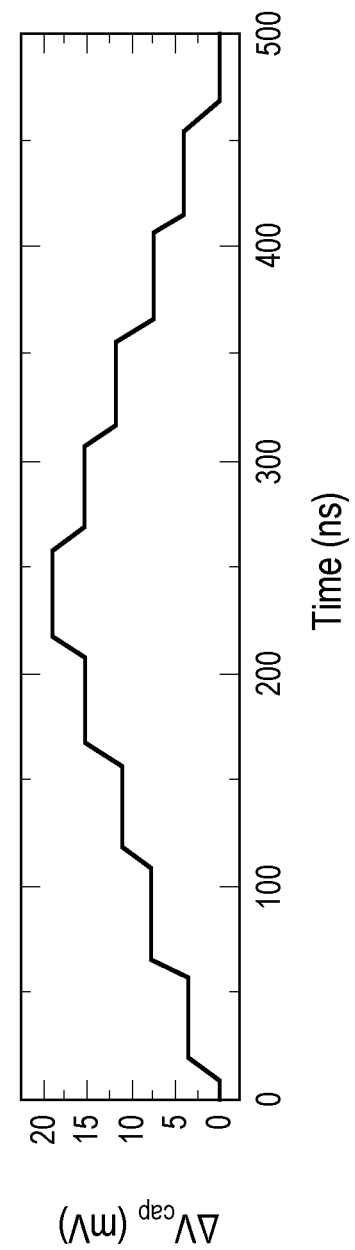

CIRCUIT FOR CMOS BASED RESISTIVE PROCESSING UNIT

CROSS-REFERENCE TO RELATED APPLICATIONS

The present invention relates to commonly-owned co-pending U.S. patent application Ser. No. 15/335,171.

BACKGROUND

The present invention relates generally to deep neural network (DNN) circuits and systems, and particularly, a novel resistive processing unit that can accelerate DNN training with an analog weight update.

Deep neural network (DNN) techniques have demonstrated great success in machine learning applications such as pattern recognition and speech recognition. Most DNN are realized through software, which is extensively time and power consuming. Research has investigated the hardware approach for DNN such as resistive processing unit (RPU) and has predicted 1000 times improvement of speed.

The concept of resistive processing unit (RPU) devices can potentially accelerate DNN training by orders of magnitude while using much less power. The RPU device proposed in co-pending U.S. patent application Ser. No. 15/335,171 can store and digitally update the weight values locally thus minimizing data movement during training and allowing to fully exploit the locality and the parallelism of a training algorithm.

FIG. 1 shows an example cross-bar matrix 50 comprising of voltage lines, e.g., V1, V2. V3 rows 55 and current lines, e.g., I1, I2, I3 columns 60 and a two terminal based RPU cross bar unit 70 at an intersection of each row with each column. Each RPU cross bar unit 70 is resistive-based and includes a variable conductance in each. Each RPU cross bar unit 70 is a two terminal based RPU with a weight value stored as the conductance (e.g., $g_{11}$, $g_{11}$, . . . , $g_{33}$) of a respective cross bar unit 70. During a data readout (forward or backward), a voltage is applied on each column (or row) and current is collected on each row (or column). For any particular row j, an amount of current read from a joined column is governed according to $$I_i = \sum_j g_{ij} \times V_j.$$

SUMMARY

A capacitor based Complementary-Metal-Oxide-Semiconductor (CMOS) resistive processing unit (RPU) for a deep neural network employing analog weight update. The capacitor based capacitor based CMOS RPU with analog update is implemented in a hardware DNN of RPU accelerators that has an optimal element to meet the requirements of RPU including read/write symmetry, retention, size, etc.

In one aspect, there is provided a CMOS-based resistive processing unit (RPU) for a neural network circuit. The RPU comprises: a capacitor device configured to store a charge representing a weight value associated with a neural network circuit operation; a current source Field Effect Transistor (FET) device operatively connected to the capacitor device; a current sink FET device operatively connected to the capacitor device; and an analog weight update circuit receiving one or more update signals generated in conjunction with a neural network circuit operation, the analog weight update circuit configured, for the neural network circuit operation, to control the current source FET device and current sink FET device to increase the stored charge on the capacitor device, or control the current source device and current sink device to decrease the stored charge on the capacitor device.

In a further aspect, there is provided a method of operating a resistive processing unit of a neural network. The method comprises: storing a charge on a complementary-metal-oxide semiconductor (CMOS) capacitor device, the charge representing a weight value associated with a neural network circuit operation; receiving at a first analog processing circuit a first analog voltage signal; receiving at a second analog processing circuit a second analog voltage signal; inputting at the first analog processing circuit a pulse signal of pre-determined pulse width during the neural network circuit operation, generating, from the input pulse signal, a further pulsed signal for input to the second analog processing circuit; generating a first analog output signal at the first analog processing circuit, and generating a second analog output signal at the second analog processing circuit, the first analog and second analog output signals of values for controlling a charging circuit operatively connected to the capacitor device and a discharging circuit operatively connected to the capacitor device to respectively increase a charge stored on the capacitor device, or decrease a charge stored on the capacitor device.

BRIEF DESCRIPTION OF THE SEVERAL VIEWS OF THE DRAWINGS

FIG. 1 generally depicts an example cross-bar matrix implementing a matrix of resistive processing units as conventionally known;

FIG. 2 shows a portion of a crossbar matrix comprising of voltage lines (rows) and current lines (columns), and a capacitor based complementary metal-oxide-semiconductor (CMOS) RPU device having a capacitor for storing a weight representing a synapse according to one embodiment of the present invention;

FIG. 7A shows a timing diagram depicting the programming to increase a charge in a capacitor weight update operation;

FIG. 7B depicts the corresponding change in charging current at the current source FET gate as a function of time corresponding to the diagram depicted in FIG. 7A;

FIG. 7C depicts the increase of the weight update capacitor voltage during the same time period of the input timing pulse signal in the example of FIG. 7A;

FIG. 8A shows a timing diagram depicting an operation of programming periodic voltage pulse train signal for a continuous, symmetric capacitor charging and discharging operations as a function of time;

FIG. 8B depicts both the Vp vector voltage and Vn vector voltage simultaneously applied to the respective first and second inverters for achieving the continuous symmetric capacitor weight update programming of FIG. 8A;

FIG. 8C depicts the resulting symmetric capacitor charging and discharging operations, and particularly, the $\Delta V_{cap}$ voltage values at the update capacitor as a function of time;

DETAILED DESCRIPTION

Figure 3:
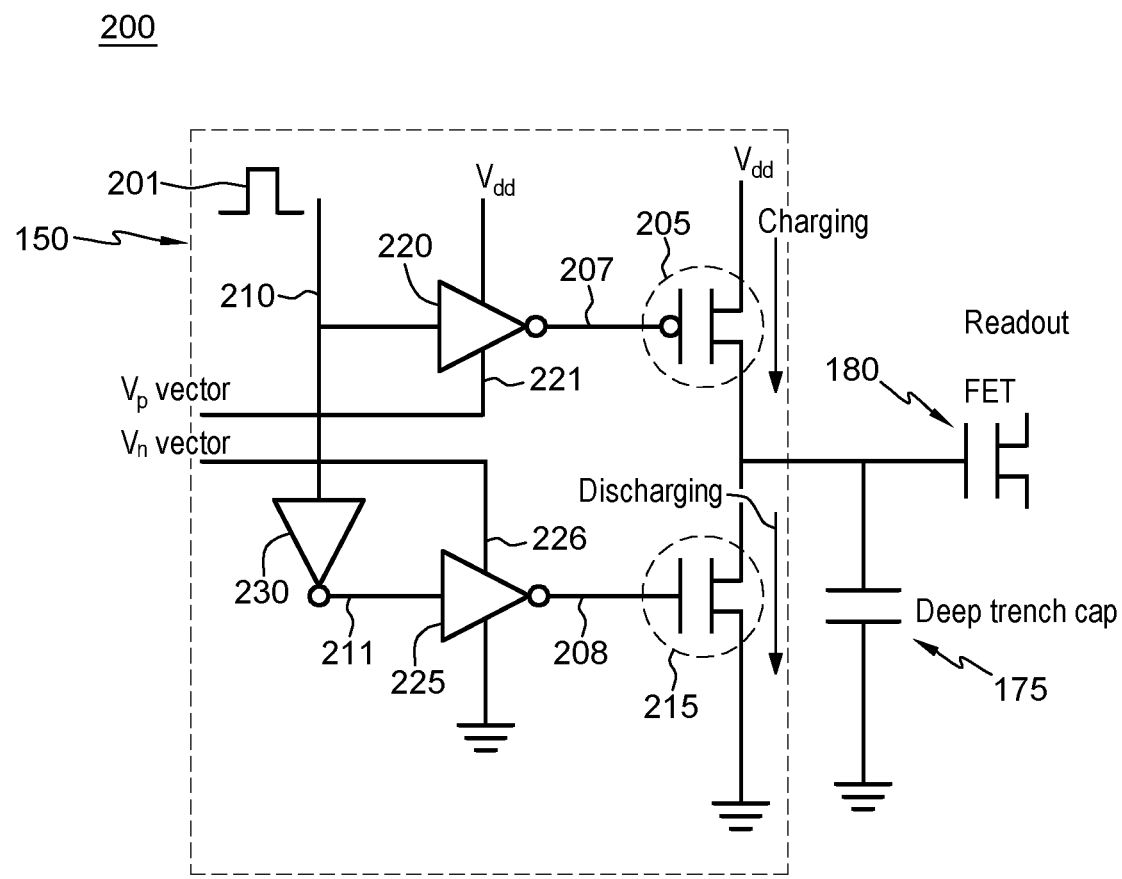
FIG. 3 shows a detailed embodiment of the analog circuit approach for programming a CMOS RPU.

As known, training of a DNN is an extremely computationally intensive task that requires massive computational resources and enormous training time. Training the DNNs relies in general on the backpropagation algorithm that is intrinsically local and parallel. Various hardware approaches to accelerate DNN training that are exploiting this locality and parallelism have been explored with use of GPU, a FPGA or specially designed ASICs.

Acceleration is possible by fully utilizing the locality and parallelism of an algorithm. For a fully connected DNN layer that maps N neurons to N neurons significant acceleration can be achieved by minimizing data movement using local storage and processing of the weight values on the same node and connecting nodes together into a massive N×N systolic array where the whole DNN can fit in.

FIG. 2 shows a crossbar matrix 100 comprising of voltage lines, e.g., V1, V2, V3 rows 155, and current lines, e.g., I1, I2, I3 columns 160, and a capacitor based complementary metal-oxide-semiconductor (CMOS) RPU device 170 having a capacitor for storing a weight representing a synapse according to one embodiment of the present invention.

In the CMOS-based RPU 170, a synapse is represented as a weight stored as a charge on an update weight capacitor 175, which modulates the conductance of readout FET 180 (a resistive element). During a neural network readout operation (forward or backward cycle), voltage is applied on each column (or row) and current is collected on each row (or column). In the non-limiting embodiment shown in FIG. 2, in each CMOS RPU 170 along a single row of the crossbar matrix 100, a drain terminal of each readout FET 180 is connected to the common row conductor, e.g., a line 156, while a source terminal of each FET 180 is connected to a respective different column conductor, e.g., a current line 161, 162, etc. Similarly, in each CMOS RPU 170 along a singe column of the cross-bar matrix 100, one source terminal of each FET 180 is connected to the common current line, e.g., line 161, while the drain terminal of each FET 180 is connected to a respective different row conductor, e.g., voltage lines 156, 157, etc. In one aspect, each CMOS RPU 170 includes a weight update circuit 150 provided for controlling the updating of the voltage on the update weight capacitor 175 thereby controlling the effective conductance of the FET 180 for a forward or backward cycle readout. In one embodiment, for neural network computations, the synapse weight is changed (updated) positively and negatively in a symmetric fashion (symmetric update) in an analog circuit approach.

Further, during a readout (forward or backward), voltage is applied on each column (or row) and current is collected on each row (or column).

FIG. 3 shows a detailed embodiment of the analog circuit approach for programming a CMOS RPU 200. Included is the weight update circuit element 150 connected to the weight storage capacitor 175 having a capacitor plate connected to a gate of a variable conductance transistor (FET) device 180 of FIG. 2. In one embodiment, the weight update element 150 includes a current source for charging, i.e., increasing a charge (a voltage) on the weight update capacitor 175, and a current sink for discharging, i.e., decreasing a charge (voltage) on the weight update capacitor 175. In one embodiment, the current source includes a transistor device, e.g., a p-channel FET 205 (charging FET) having a first terminal (e.g., source terminal) connected to a power supply voltage source (Vdd) and a second terminal (e.g., drain terminal) connected to a capacitor plate that is adapted to add charge to and increase a charge on the capacitor 175 thereby modifying the input voltage to a gate terminal of the variable conductance transistor (FET) device 180. Likewise, the current sink includes a transistor device, e.g., a n-channel FET 215 (discharging FET) having a first terminal (e.g., source terminal) that is connected to a ground potential and a second terminal (e.g., drain terminal) connected to the capacitor plate and that is adapted to sink current and decrease the charge of the capacitor 175 thereby modifying the input voltage at the gate terminal of the variable conductance transistor (FET) device 180.

As shown in FIG. 3, for controlling a charging operation of the weight update capacitor 175, a first CMOS inverter element 220 is biased with a first Vdd power supply voltage and a Vp vector voltage or equal or lesser value, and is configured to receive a pulsed signal on input conductive line 210 to generate a current drive signal on conductive line 207 for input to a gate terminal of the current source charging FET 205. Similarly, for controlling a discharging operation of the update weight capacitor 175, a second CMOS inverter element 225 is biased with a ground potential and a Vn vector voltage of equal or greater value, and is configured to receive a pulse signal on conductive line 211 to generate a current drive signal on conductive line 208 for input to a gate terminal of the current drain discharging FET 215.

In particular, as further shown in FIG. 3, the first inverter element 220 is shown connected to a voltage supply source, e.g., Vdd, and is further connected to a voltage signal generator or like voltage signal source via a conductor line 221 for receiving a Vp vector: current or voltage signal. The Vp vector: voltage signal is set to determine the gate voltages of current sources and therefore determine the magnitude of charging current. Likewise, the second inverter element 225 is shown connected to a ground potential, and is further connected to a voltage signal generator or like voltage signal source via a conductor line 226 for receiving a Vn vector: voltage signal. The Vn vector: voltage signal is set to determine the gate voltages of current sinks and therefore determine the magnitude of discharging current.

In one embodiment, the pulse signal received at the second inverter element 225 on conductor 211 is inverted from the pulse signal input on conductor 210 by provision of a third CMOS inverter element 230 biased to operate between the Vdd and ground voltages, and which receives the pulse signal at line 210 and inverts it for input to the inverter 225 via conductor 211.

Further in FIG. 3, during an update for one or more CMOS RPUs 200 at an intersecting column and row of the cross-bar matrix, the weight update circuit 150 receives analog voltages and width modulated pulses and applies the analog voltages to control an amount of current and width modulated pulses to control the "on" time of the current amount used for charging/discharging the weight capacitor 175. In one embodiment, third inverter element 230 receives a pulse (analog) signal 201 on conductor line 210 which pulse may range from between 0 V to $V_{dd}$ in voltage with a variable pulse width. In one embodiment, the pulse width is used to modify the updating capacitor charge updating time.

Figure 4:
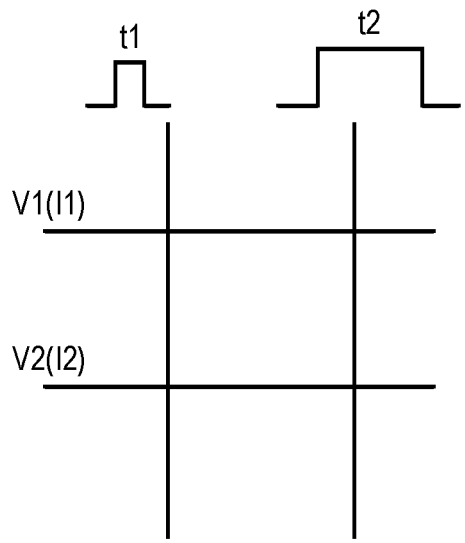
FIG. 4 conceptually depicts a section of a cross-bar matrix showing two rows configured as voltage lines V1 (or I1), and V2 (or I2), and the receipt of timing pulses at two different pulse widths received at two different columns in the matrix.

As shown in FIG. 4, there is conceptually depicted a section of a cross-bar matrix 400 showing two rows configured as voltage lines V1 (or I1), and V2 (or I2), and the receipt of pulses at a weight update circuit (not shown) using two different pulse widths "t1" and "t2" for updating capacitors at RPUs situated at at two different columns in the matrix.

Figure 5:
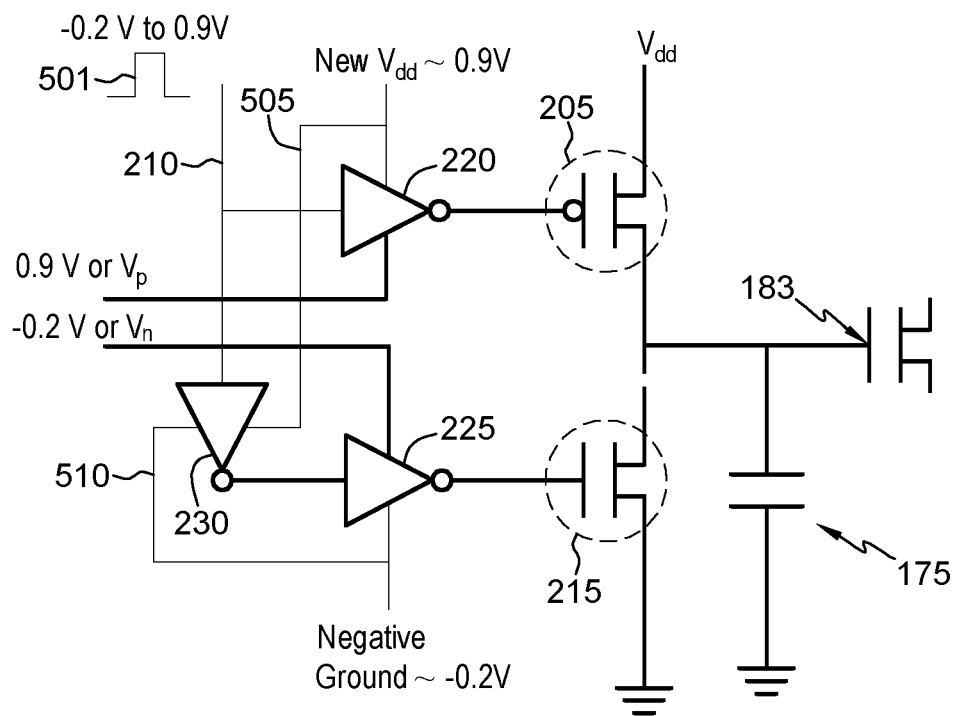
FIG. 5 shows an example implementation of the CMOS based capacitor weight update circuit corresponding to the RPU of FIG. 3.

FIG. 5 shows an example implementation of the CMOS based capacitor weight update circuit 500 for the RPU of FIG. 3 however modified for improving capacitor charge retention time. In the embodiment shown in FIG. 5, the CMOS based capacitor weight update circuit 150 is shown having: the current source embodied by transistor device, e.g., a p-channel FET 205 (charging FET) and used for increasing a charge (a voltage) on the weight update capacitor 175; and the current sink transistor device, e.g., a n-channel FET 215 (discharging FET) for decreasing a charge (voltage) on the weight update capacitor 175. The voltage on the capacitor 175 is applied to control a gate 183 of the readout FET 180.

In the embodiment depicted in FIG. 5 modified for improving capacitor charge retention time, inverter element 220 is shown receiving, at a first input terminal, a "new" Vdd voltage, e.g., supplied by a power source (not shown) to bias the inverter at a value of about 0.9 V. This value is greater than the current standard Vdd of the technology, e.g., Vdd=0.8V. This supply voltage source additionally is connected to a first terminal of the inverter element 230 via conductor 505. In the embodiment shown in FIG. 5, inverter element 220 is further shown receiving, at a second terminal, a voltage representing the Vp vector for a weight update operation. In another embodiment, this operation may be a matrix multiplication (vector outer product). As shown, the Vp vector voltage Vp is 0.9 V or less volts provided by a voltage source (not shown).

Inverter element 225 is shown receiving, at a first terminal, a negative ground potential, shown for example at a voltage of about −0.2 V. This negative ground voltage additionally is provided to a second terminal of the inverter element 230 via conductor 510. Further, inverter element 225 is shown receiving, at a second terminal, a voltage representing the Vn vector for a weight update operation. As shown, the Vn vector voltage Vn is −0.2 V or greater as provided by a voltage source (not shown).

The third CMOS inverter element 230 is further shown receiving the pulse signal 501 at input line 210. In the implementation shown in FIG. 5, the pulse signal 501 may range anywhere in height from between 0.9 V to −0.2 V and may be set at a variety of pulse widths as discussed below.

In operation, the width of the timing pulse input to the inverter elements 220 and 225 of FIG. 5, the new Vdd and negative ground potential bias voltages in conjunction with the voltage values Vp or Vn in weight update circuit 500 may be configured to apply a precise amount a current increase which is used to charge the weight update capacitor to a new greater level. Similarly, the timing pulse input to the inverter elements 220 and 225 of FIG. 5, the new Vdd and negative ground potential bias voltages in conjunction with the voltage values Vp or Vn may control an amount of current level decrease which is used to discharge the update capacitor to a lower level. That is, a change in weight value $\Delta\omega_{ij}$ (e.g., at an RPU circuit located at an intersection of row i, column j of a crossbar matrix) as embodied as a difference in the capacitor stored charge or voltage $\Delta V_{cap}$, may be periodically controlled by sourcing an amount of current $I_i$ to the weight update capacitor or sinking an amount of current $-I_i$ from the weight update capacitor at any one time period $t_j$, i.e., $$\omega_{ij} \sim \Delta V_{cap} \sim I_i * t_j$$

Figure 6:
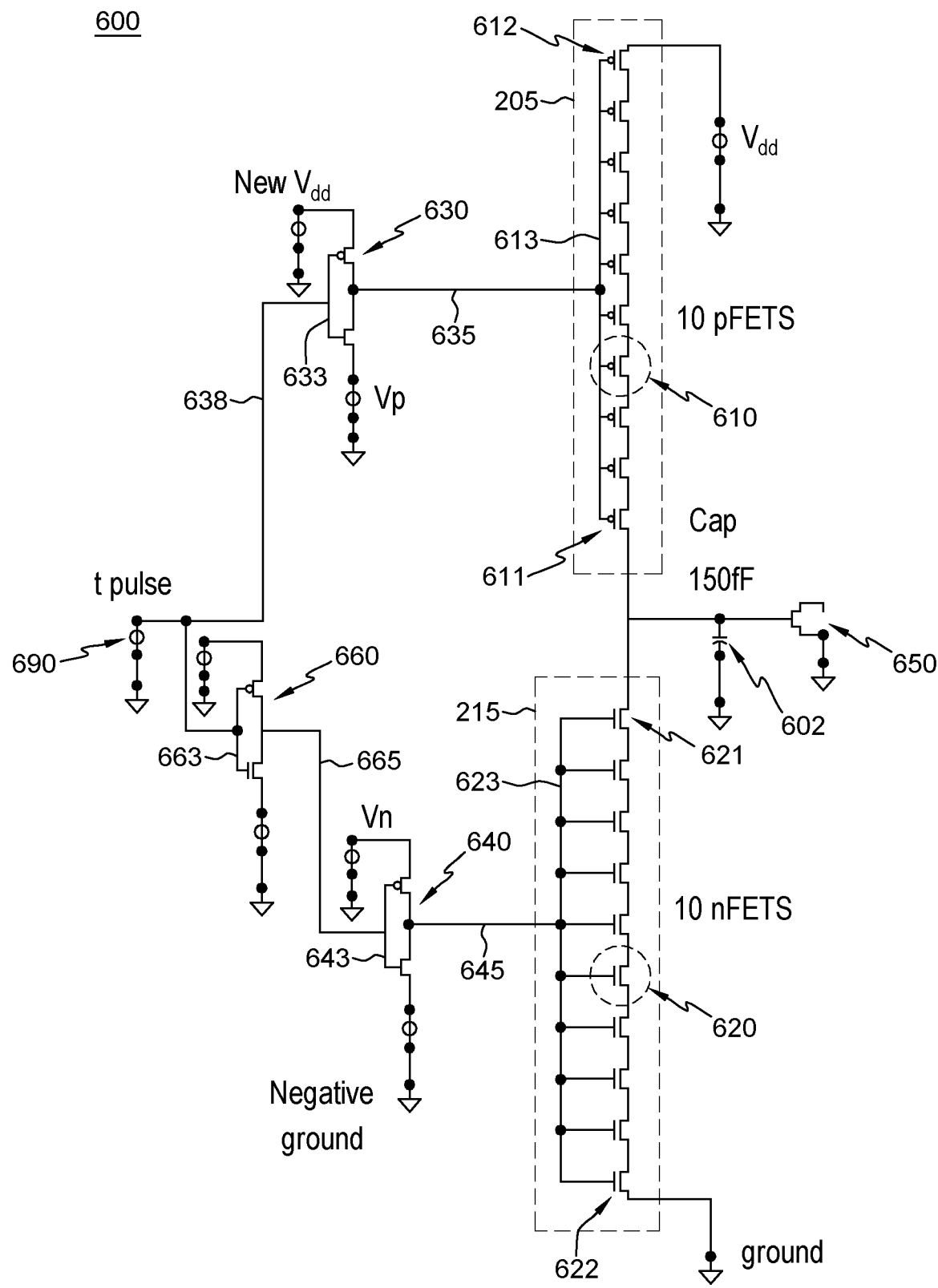
FIG. 6 shows an example physical circuit implementation of an analog-based capacitor weight update circuit embodied as interconnected CMOS devices.

FIG. 6 shows an example physical circuit implementation of an analog-based capacitor weight update circuit 600 embodied as interconnected analog CMOS devices. As shown in FIG. 6, the CMOS based capacitor weight update circuit 600 includes capacitor, formed as a deep trench capacitor 602 (e.g., having a large aspect ratio of greater than 4) on a semiconductor substrate using analog CMOS manufacturing processes. It is understood that the CMOS based capacitor 602 may be embodied in other forms, e.g., such as a metal-insulator-metal (MIM) capacitor. In a non-limiting implementation, the capacitor 602 is formed to have a capacitance of 150 fF (femtoFarads), but could range anywhere from between 10 fF to 10 pF. The capacitor 602 is connected to the gate of the readout FET 650. In one embodiment, the p-channel charging FET 205 implemented as a current source for weight update capacitor charging may include a plurality of series connected p-channel FETs 610 each having a common connected gate terminal 613. One charging FET 611 at one end of the series connected FETs has a drain terminal connected to a charge plate of the deep trench capacitor 602. One charging FET 612 at the other end of the series connected FETs has a source terminal connected to a fixed Vdd voltage source. In one non-limiting embodiment, the Vdd voltage may be 0.8 V or 0.9 volts. Further, it is understood that any number of series connected charging FETs may be used to provide high enough output resistance for increasing a charge (a voltage) on the weight update capacitor 602. Alternatively, a single connected long channel FET may be used to provide high enough output resistance for increasing the weight update capacitor charge.

Further, the n-channel FET 215 implemented as a current sink for capacitor discharging may include a plurality of series connected n-channel FETs 620 each having a common connected gate terminal 623. The discharging FET 621 at one end of the series connected FETs has drain terminal connected to the charge plate of the deep trench capacitor 602. One charging FET 622 at the other end of the series connected FETs has a source terminal connected to a ground potential. Any number of series connected charging FETs 620 may be used to provide high enough output resistance for decreasing a charge (a voltage) on the weight update capacitor 602. Alternatively, a single connected long channel FET device may be used to provide high enough output resistance for decreasing the capacitor charge.

As shown in FIG. 6, a CMOS based first inverter 630, e.g., corresponding to inverter 220 of FIG. 3, is shown having a series connected NMOS FET and PMOS FET having a common connected gate terminal 633. The source terminal of the PMOS FET is connected to the Vdd supply voltage (e.g., about 0.9 V) and the source terminal of the NMOS FET is connected to a conductor for receiving the update voltage Vp. In one non-limiting embodiment, the Vp vector voltage may be 0.503 mV (millivolts). A conductor 635 connects commonly connected third terminals (PMOS drain and NMOS drain terminals) at a common node of the series connected NMOS FET and PMOs FET to the common gate terminals 613 of the series connected p-channel FETs 610. The commonly connected gate terminal 633 of the first CMOS inverter 630 connects, via a further conductor 638, to a pulsed voltage source 690 providing a voltage pulse tp of programmable pulse widths and voltages.

Similarly, as shown in FIG. 6, a CMOS based second inverter 640, e.g., corresponding to inverter 225 of FIG. 3, is shown having a series connected NMOS FET and PMOS FET devices having a common connected gate terminal 643 The source terminal of the PMOS FET is connected to a conductor for receiving the update voltage Vn. In one non-limiting embodiment, the Vn vector voltage may be −0.2 V. The drain of the NMOS FET is connected to Vss or a negative ground voltage potential (e.g., also about −0.2 V). A conductor 645 connects commonly connected third terminals (NMOS source or PMOS drain terminals) at a common node of the series connected NMOS FET and PMOs FET to the common gate terminals 623 of the series connected n-channel FETs 620.

Similarly, as shown in FIG. 6, the CMOS based third inverter 660, e.g., inverter 230 of FIG. 3, is shown having a series connected NMOS FET and PMOs FET having a common connected gate terminal 663. The source terminal of the PMOS FET is connected to the Vdd supply voltage (e.g., about 0.9 V) and the source terminal of the NMOS FET is connected to a Vss or a negative ground potential (e.g., also about −0.2 V). A conductor 665 connects commonly connected third terminals (PMOS drain and NMOS drain terminals) at a common node of the series connected NMOS FET and PMOs FET to the common gate terminal 643 of the second inverter 640. The commonly connected gate terminal 663 of the third inverter 660 is also connected to conductor 638 for receiving from the voltage source the voltage pulse tp of varying pulse widths and voltages.

It is understood that the first, second and third inverters may comprise other logic device elements.

FIG. 7A shows a timing diagram 700 depicting the programming to increase a charge in a weight update operation. In one embodiment, the amount of charge (or voltage) increase at the update capacitor is governed according to the pulse width of pulse signal $t_p$ 710 applied to turn on the first inverter 220 in addition to the applied Vp voltage and new Vdd voltage biasing the first inverter. In one example, while the pulse signal 710 is used to turn the first inverter on, the pulse signal additionally turns off the second inverter 225, and vice versa, i.e., the pulse signal 710 is used to turn the second inverter on, while additionally turning off the first inverter 220. In an example embodiment shown in FIG. 7A, the timing pulse 710 is asserted as a pulse ranging from a voltage increase from just under 0.0 V (e.g., −0.2) to 0.9 Volts for about 10.0 ns. With the application of the timing pulse, and the Vp vector voltage at about 500 mV biasing the first inverter, an output Vg (gate) voltage 720 is applied at the gate of the charging FET 205 for precise controlling of the update capacitor 175. For example, at the first inverter output, the Vg voltage 720 at the gate voltage of the current source FET 205 is shown decreasing from about 0.9 Volts (new Vdd) to about 0.5 volts during that same 10.0 ns time period the first inverter is on. This Vg charging signal 720 turn on the current source FET 205 to provide current used to increase the charge stored at the update capacitor, i.e., a charge increase 740 ($\Delta V_{cap}$) as shown in FIG. 7C.

FIG. 7B depicts the corresponding change in charging current at the current source FET gate, i.e., increasing in the negative direction from about 0.0 nanoAmperes (nA) to about −0.60 nA during a current capacitor charging operation for the same time period e.g., 10 ns. FIG. 7C depicts, for the example first inverter voltages Vp (which controls a current level), Vdd and timing pulse applied, the capacitor charging operation, wherein the weight update capacitor voltage is shown increasing from 400 mV to about 404 mV during the same time period of the input pulse width pulse signal $t_p$. It is understood that, during the capacitor charging operation, for the second inverter 225 the negative ground and the Vn vector voltage signal will be both at about −0.2 thereby turning off the current sink FET 215.

It is understood that to decrease the charge of the weight update capacitor 175, the Vp voltage at the first inverter will be applied as 0.9 volts, for example, to thereby turn off the first inverter 220. The Vn voltage may be increased to a positive voltage and the $t_p$ pulse will control the amount of time the second inverter 225 is turned on, during which time the current sink is turned on to sink current, i.e., remove charge, from the update capacitor.

FIG. 8A shows a timing diagram 800 depicting an operation of programming periodic voltage pulse train signal 810, e.g., a series of pulse voltages at the input of the write circuit 150 for a continuous capacitor charging and discharging operations as a function of time. In one embodiment, each pulse of the pulse train 810 is the same pulse height and duration as the $t_p$ pulse 710 of FIG. 7A. FIG. 8B depicts both the Vp vector voltage 820 and Vn vector voltage 830 simultaneously applied to the respective first and second inverters for the continuous capacitor weight update programming. As shown, a capacitor charging operation results during application of the first five $t_p$ pulse cycles, when Vp voltage is at 500 mV and Vn voltage is at the negative ground potential (e.g., −0.2 V). During the next five $t_p$ pulse cycles, a capacitor discharging operation results with the Vp voltage increased to 900 mV and the Vn voltage is raised positive (e.g., to about 0.4 V). FIG. 8C depicts the resulting symmetric capacitor charging and discharging operations, and particularly, the $\Delta V_{cap}$ voltage values and timing of the voltage at the update capacitor as a function of time relative to the input periodic pulse train signal 810.

Figure 9:
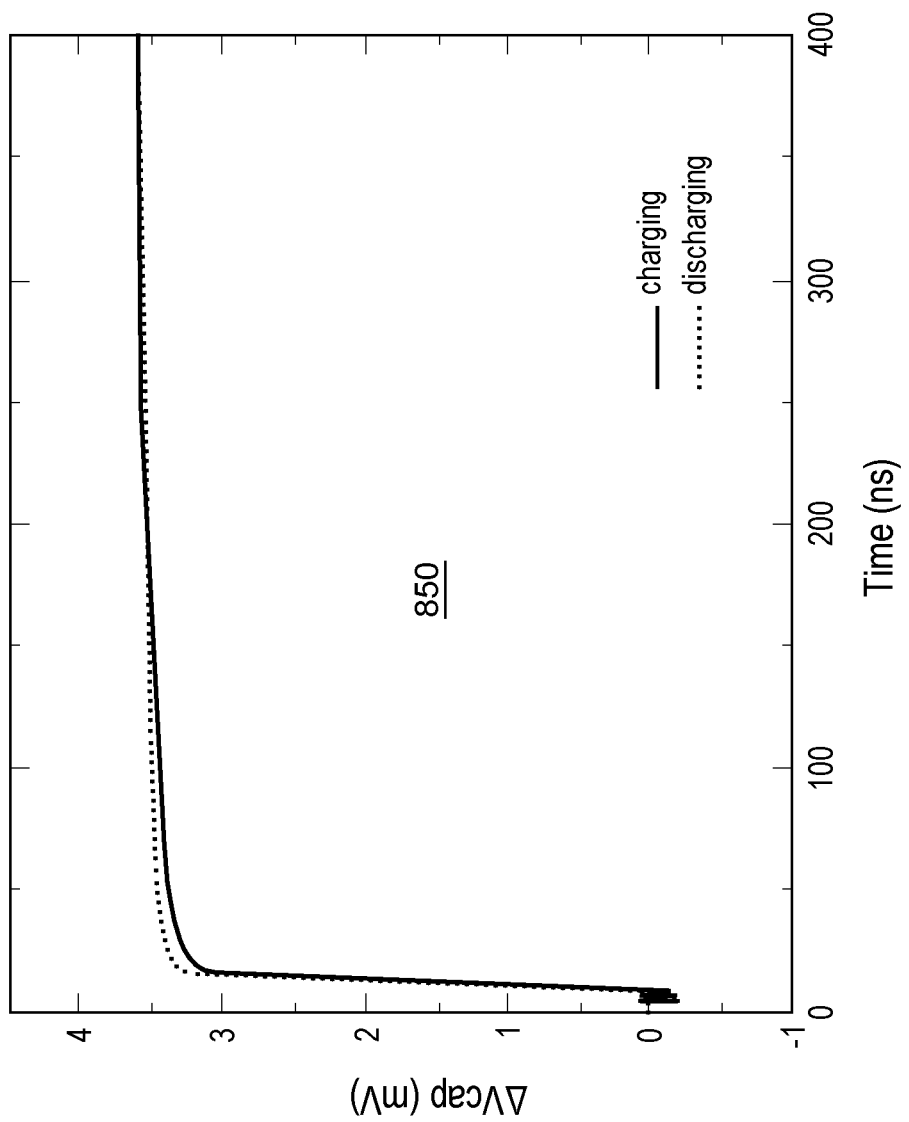
FIG. 9 shows a plot 850 visualizing a superposition of the difference between the capacitor charged and discharged states, i.e., a ΔVcap, over time.

FIG. 9 shows a plot 850 visualizing a superposition of the difference between the capacitor charged and discharged states, i.e., a ΔVcap, over time. The ΔVcap voltage plot 850 shows the symmetry over time, how the increasing and decreasing charge amounts in capacitor voltage are almost identical.

Figure 10B:
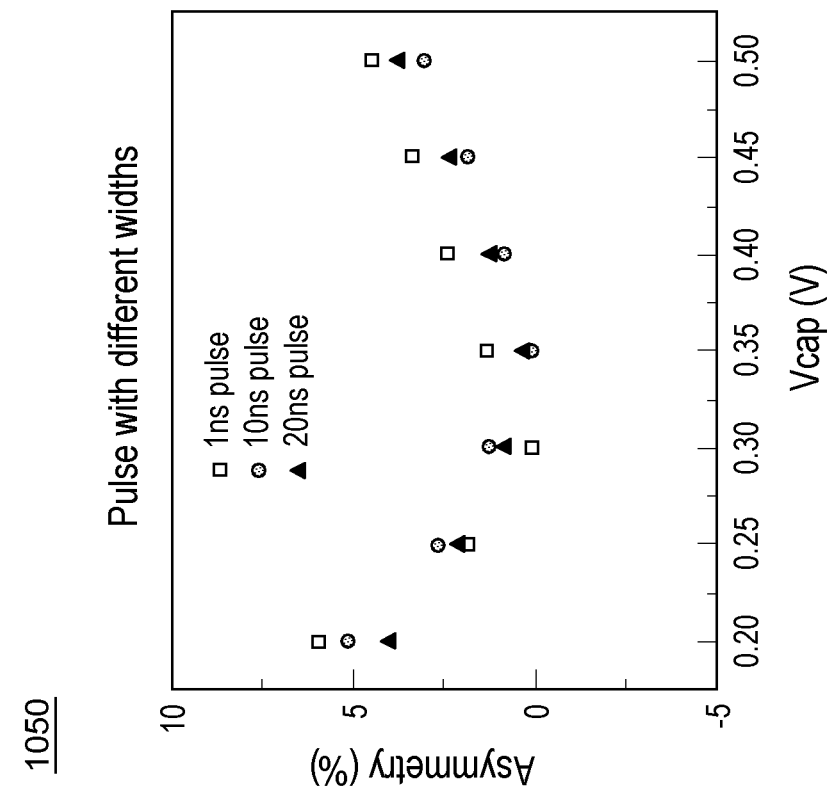
FIG. 10B shows a plot for visualizing asymmetry as a percentage to quantify how asymmetric the Vcap voltage is (as a percentage) as a function of Vcap for applied pulses of different pulse widths.
Figure 10A:
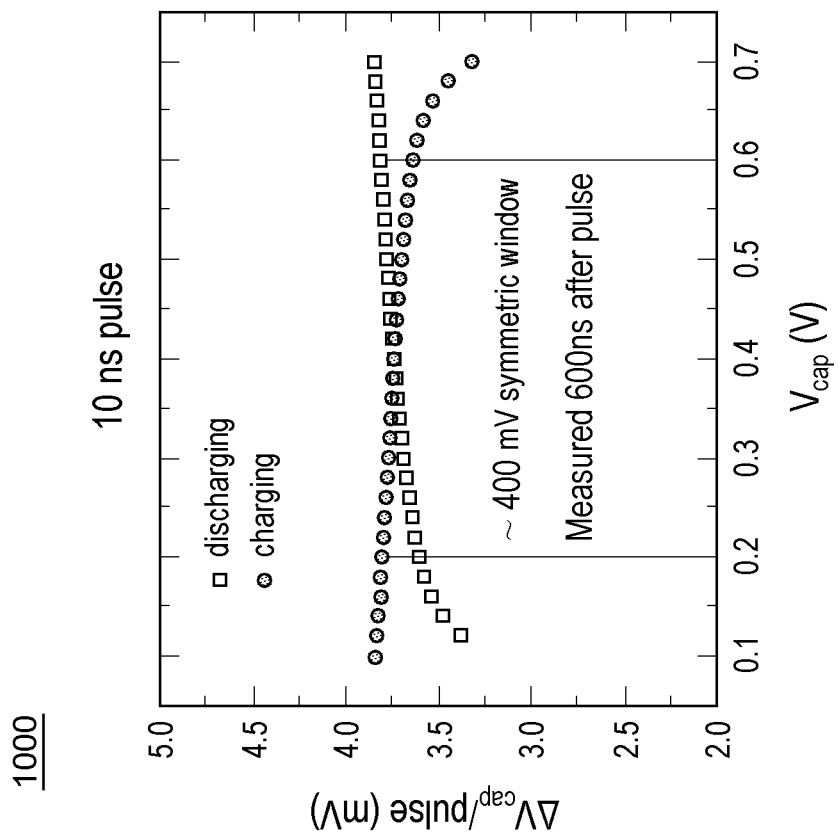
FIG. 10A shows a plot for visualizing an example simulation result that depicts the degree of symmetry achievable for updating stored capacitor charge and discharge at the capacitor based on the weight update circuit configuration of FIG. 5.

FIG. 10A shows a plot 1000 for visualizing an example simulation results that depict the degree of symmetry achievable for updating stored capacitor charge and discharge at the capacitor based on the weight update circuit configuration of FIG. 5. For example, the plot 1000 depicts a changing of the capacitor voltage per pulse ($\Delta V_{cap}$/pulse (e.g., in millivolts) plotted as a function of the capacitor voltage $V_{cap}$ (V). In the simulation, there were applied a pulse train of 10 ns pulses input with capacitor each voltage measurement taken about 600 ns after each pulse. As shown, the symmetric window is the regions of capacitor voltage (Vcap) where a capacitor voltage discharge per input pulse 1010 ($\Delta V_{cap}$/pulse) and the capacitor voltage charging per pulse ($\Delta V_{cap}$/pulse) 1020 are linear. Thus, as shown in the simulations result example of FIG. 10, there is provided about a 400 mV (Vdd=0.8V) symmetric window in which the capacitor voltage charging and voltage discharging ($V_{cap}$ voltage range) operation is linear.

FIG. 10B shows a plot 1050 for visualizing asymmetry in a percentage to quantify how asymmetric the Vcap voltage is (as a percentage) as a function of Vcap for applied pulses of different pulse widths. In the example results shown, a weight change mismatch for pulses of different weights will not exceed 5%. That is, for each of update timing pulses of 1 ns, 10 ns and 20 ns widths, there appears a range of asymmetry (weight change mismatch) from between 0% to about 5% and not exceeding about 5% of symmetry.

Figure 11:
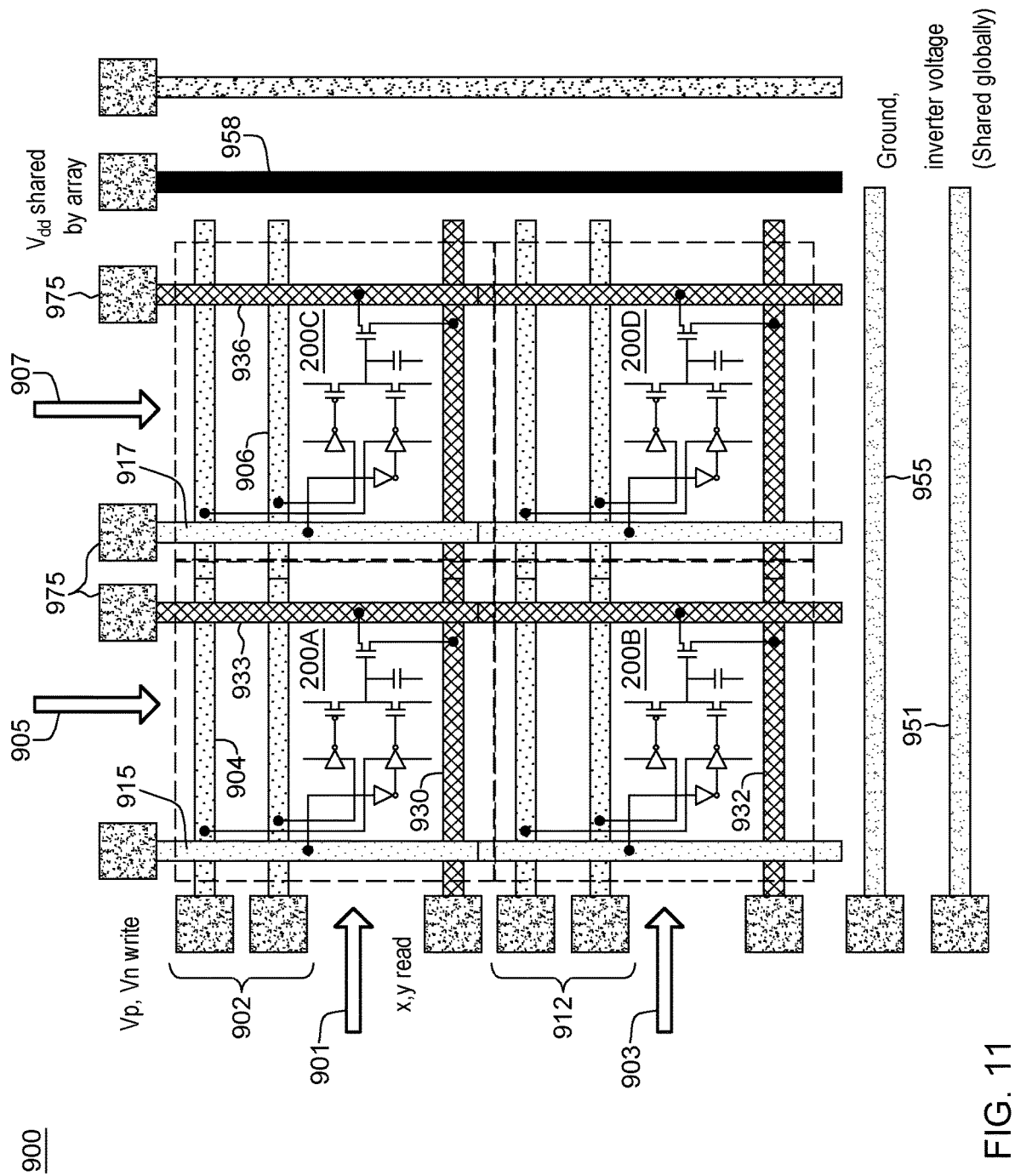
FIG. 11 shows a portion of a 2D crossbar matrix showing the electrical connections of CMOS-based RPUs used for carrying out matrix multiplication operations in a neural network circuit.

FIG. 11 shows a portion of a 2D crossbar matrix 900 showing the electrical connections of CMOS-based RPUs used for carrying out matrix multiplication operations in a neural network circuit. In a non-limiting embodiment, the crossbar matrix 900 may include columns and rows of RPUs according to an n×m array, n and m being integers greater than 1. In particular, there are shown the connections for reading data, e.g., along row lines 930, 932 or column lines 933, 936, from the RPU and writing data, e.g., along pairs of row lines 902, 912 to the RPU, when carrying out matrix multiplication operations. In FIG. 11 there is further shown formed, for each of the lines described as part of the crossbar, electrically connected conductive pad structures 975.

In one embodiment, during a data readout (forward or backward), voltage may be applied on each column (or row) and current is collected on each row (or column).

More particularly, as shown in the matrix cross-bar portion 900 are pairs 902, 912 of write lines for writing the vector voltage Vp voltage and vector Vn voltage value to all the RPUs in a particular row 901, 903 when performing a update operation. In one embodiment, the Vp value is the same among one row, but may be different between different rows. Similarly, the Vn value is the same among one row, but may be different between different rows. For example, in write conducting line pair 902, conductor 904 may supply the vector voltage Vn while a conductor 906 may supply the vector voltage Vp to each RPU 200 at each intersection with a respective column 905, 907 along that row. In like manner, for each respect each additional row, e.g., row 903, the pair of conducting write lines 912 may supply the vector voltage Vp and the vector voltage Vn to each RPU 200 at each intersection with a respective column 905, 907 along that row 903. Additionally, a shown in FIG. 11, associated with each column 905, 907 of the matrix is an associated column conductor 915, 917 for receiving a programmed pulse signal of a programmed width to each RPU along a respective column 905, 907. The pulse width of the pulse signal received at the columns 905, 907 is programmable to update a weight at the update capacitor, e.g., in a manner such as described with respect to FIG. 7A. As shown in FIG. 4, different pulse signals of different widths may be applied to RPUs along a respective column during a weight update operation.

As shown in the matrix cross-bar portion 900, associated with each respective RPU along a particular row are the conducting column read line and conducting row read line for reading out a voltage or current depending upon a specific matrix operation. For example, associated with RPUs 200A, 200C along row 901 is built a read conducting line 930 for connection to the drain terminal of the read out FET 180 of each RPU along the row. Likewise, associated with RPUs 200B, 200D along row 903 is built a read conducting line 932 for connection to the drain terminal of the read out FET 180 of each RPU along that row. For RPUs 200A, 200B along a column 905 is built a read conducting line 933 for connection to the source terminal of the read out FET 180 of each RPU along the column. Similarly, for RPUs 200C, 200D along a column 907 is built a read conducting line 936 for connection to the source terminal of the read out FET 180 of each RPU along that column.

Additionally shown are globally shared lines 958 that provide the respective potentials such as the negative ground 951, and the new Vdd voltage 955 to all of the inverter PMOS and NMOS of the RPUs, and the regular $V_{dd}$ shared by each the RPU's current source device throughout the cross-bar.

Employing a crossbar matrix 900 as a system employing thousands of RPU elements enables the tackling of "Big Data" problems with trillions of parameters that is currently impossible to address such as, for example, natural speech recognition and translation between all world languages, real-time analytics on large streams of business and scientific data, integration, and analysis of multimodal sensory data flows from a massive number of IoT (Internet of Things) sensors.

Further, as known, a deep neural network backpropagation algorithm is composed of three cycles, forward, backward and weight update that are repeated many times until a convergence criterion is met. The forward and backward cycles mainly involve computing vector-matrix multiplication in forward and backward directions. This operation can be performed on the 2D crossbar array 900 of resistive devices such as shown in FIG. 11.

In a forward cycle, stored conductance values in the crossbar array form a matrix, whereas an input vector is transmitted as voltage pulses through each of the input rows, for example. In a backward cycle, when voltage pulses are supplied from columns as an input, then the vector-matrix product is computed on the transpose of a matrix.

In contrast to forward and backward cycles, implementing the weight update on a 2D crossbar array of resistive devices locally and all in parallel, independent of the array size, requires calculating a vector-vector outer product which consist of a multiplication operation and an incremental weight update to be performed locally at each cross-point.

In further embodiments, during inference, the weights on capacitors of the matrix are refreshed periodically, or readout and stored in a memory storage device, e.g., in a connected SRAM device or like non-volatile memory (not shown).

In one embodiment, in order to implement a local and parallel update on an array of two-terminal devices that can perform both weight storage and processing (Resistive Processing Unit or RPU) the multiplication operation itself is simplified by using stochastic computing techniques.

However, instead of using stochastic signals, the device and structure of the present disclosure provides an alternative approach that uses analog signals to perform weight update, which has simpler unit cell design than stochastic approach.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A CMOS-based resistive processing unit (RPU) for a neural network circuit comprising:
   a capacitor device configured to store a charge representing a weight value associated with a neural network circuit;
   a current source Field Effect Transistor (FET) having a terminal operatively connected to a terminal of said capacitor device, said current source FET providing a charging current through said current source FET terminal to increase a charge stored at the capacitor device;
   a current sink FET having a terminal operatively connected to the terminal of said capacitor device, said current sink FET receiving a current discharging from the capacitor device through the current sink FET terminal; and
   an analog weight update circuit receiving update signals generated in the neural network circuit and responding to said update signals to control said current source FET and said current sink FET to increase said stored charge on said capacitor device, or to control said current source FET and said current sink FET to decrease said stored charge on said capacitor device, said analog weight update circuit comprising:
      a first inverter circuit having an output terminal operatively connected to an input gate of said current source FET, said first inverter circuit receiving a first set of said update signals and responsively providing an output signal to the input gate to control an amount of current flow through said current source FET; and
      a second inverter circuit having an output terminal operatively connected to an input gate terminal of said current sink FET, said second inverter circuit receiving a second set of said update signals and responsively providing an output signal to the input gate to control an amount of current flow through said current sink FET.

2. The RPU as claimed in claim 1, wherein said first set of said update signals received by said
   first inverter circuit comprises: a first analog control signal and a first timing pulse for controlling said amount of current flow through said current source FET; and
   said second set of said update signals received by said second inverter circuit comprises: a second analog control signal and a second timing pulse received for controlling said amount of current flow through said current sink FET.

3. The RPU as claimed in claim 2, wherein said neural network circuit performs a vector-vector outer product operation, said received first analog control signal comprising:
   a voltage value representing a portion of a first vector involved in said neural network vector-vector outer product operation, and said received second analog control signal comprising:
   a voltage value representing a portion of a second vector involved in said neural network vector-vector outer product operation, and
   said first inverter circuit being biased to operate at voltage levels between said a value of said received first analog voltage signal and a voltage supply value at a same or greater value than said first analog voltage value; and
   said second inverter circuit being biased to operate at voltage levels between said a value of said received second analog voltage signal and a ground potential at a same or lesser value than said second voltage value.

4. The RPU as claimed in claim 3, wherein said ground potential of lesser value is a zero or negative ground potential.

5. The RPU as claimed in claim 3, wherein both said first timing pulse and second timing pulse are a respective first pulse train and a second pulse train, wherein both said first pulse train and said second pulse train and a combination of respective first vector voltage and second vector voltage values provide capacitor charge increase steps and subsequent capacitor charge decrease steps in symmetrical fashion over a period of time.

6. The RPU as claimed in claim 3, wherein said analog weight update circuit further comprises:
   a third inverter circuit having an input for receiving said first timing pulse, and generating as an output said second timing pulse for receipt by said second inverter circuit.

7. The RPU as claimed in claim 6, where said first inverter circuit comprises
   a P-channel MOS FET device (PMOS device) having a gate, drain and source terminals; and
   a N-channel MOS FET device (NMOS device) having a gate, drain and source terminals, wherein said gate terminal of said PMOS device is connected to said gate terminal of said NMOS device, said connected gate terminals configured to receive said first timing pulse, and
   wherein a drain terminal of said PMOS FET is connected to said drain terminal of said NMOS FET, said connected PMOS FET drain and NMOS FET drain terminals being electrically connected to the input gate terminal of said current source FET.

8. The RPU as claimed in claim 6, where said second inverter circuit comprises:
   a P-channel MOS FET device (PMOS device) having a gate, drain and source terminals;
   a N-channel MOS FET device (NMOS device) having a gate, drain and source terminals, wherein said gate terminal of said PMOS device being electrically connected to said gate terminal of said NMOS device, and
   wherein a drain terminal of said PMOS device is connected to said drain terminal of said NMOS device, said connected PMOS device drain terminal and NMOS device drain terminal being electrically connected to the input gate terminal of said current sink FET.

9. The RPU as claimed in claim 8, where said third inverter circuit comprises:
   a P-channel MOS FET device (PMOS device) having a gate, drain and source terminals;
   a N-channel MOS FET device (NMOS device) having a gate, drain and source terminals, wherein said gate terminal of said PMOS device is connected to said gate terminal of said NMOS device, said connected gate terminals configured to receive said first timing pulse; and
   wherein a drain terminal of said PMOS device is connected to said drain terminal of said NMOS device, said connected PMOS device drain terminal and NMOS device drain terminal being electrically connected to said electrically connected gate terminals of said second inverter circuit.

10. A crossbar matrix array circuit for performing neural network operations, said circuit comprising:

a resistive processing unit (RPU) circuit located at an intersection of a row conductor and a column conductor of said matrix array, each RPU circuit comprising:
   a capacitor device configured to store a charge representing a weight value associated with a neural network circuit;
   a current source Field Effect Transistor (FET) having a terminal operatively connected to a terminal of said capacitor device, said current source FET providing a charging current through said current source FET terminal to increase a charge stored at the capacitor device;
   a current sink FET having a terminal operatively connected to the terminal of said capacitor device, said current sink FET receiving a current discharging from the capacitor device through the current sink FET terminal; and
   an analog weight update circuit receiving update signals generated in the neural network circuit and responding to said update signals to control said current source FET and said current sink FET to increase said stored charge on said capacitor device, or to control said current source FET device and said current sink FET device to decrease said stored charge on said capacitor device, said analog weight update circuit comprising:
   a first inverter circuit having an output terminal operatively connected to an input gate of said current source FET, said first inverter circuit receiving a first set of said update signals and responsively providing an output signal to the input gate to control an amount of current flow through said current source FET; and
   a second inverter circuit having an output terminal operatively connected to an input gate terminal of said current sink FET, said second inverter circuit receiving a second set of said update signals and responsively providing an output signal to the input gate to control an amount of current flow through said current sink FET, and
a readout circuit operatively connected to a row conductor or column conductor and responsive to a charge stored on said capacitor device for generating a voltage or current value corresponding to a neural network matrix vector multiplication operation, said voltage or current value accessed at a particular row or column associated with the RPU.

11. The crossbar matrix array circuit as claimed in claim 10, wherein said first set of said update signals received by said first inverter circuit comprises:
   a first analog control signal and a first timing pulse for controlling said amount of current flow through said current source FET; and said second set of said update signals received by said second inverter circuit comprises:
   a second analog control signal and a second timing pulse received for controlling said amount of current flow through said current sink FET.

12. The crossbar matrix array circuit as claimed in claim 11, wherein said neural network circuit performs a vector-vector outer product operation, said received first analog control signal comprising:
   a voltage value representing a portion of a first vector involved in said neural network vector-vector outer product operation, and said received second analog control signal comprising:
   a voltage value representing a portion of a second vector involved in said neural network vector-vector outer product operation,
      said first inverter circuit being biased to operate at voltage levels between said a value of said received first analog voltage signal and a voltage supply value at a same or greater value than said first analog voltage value; and
      said second inverter circuit being biased to operate at voltage levels between said a value of said received second analog voltage signal and a ground potential at a same or lesser value than said second voltage value.

13. The crossbar matrix array circuit as claimed in claim 12, wherein said neural network vector-vector outer product comprises: a multiplication operation and an incremental weight update performed locally at a cross-point of said crossbar matrix array circuit.

14. The crossbar matrix array circuit as claimed in claim 12, wherein for said neural network vector-vector outer product multiplication operation, a data readout operation comprises:
   a voltage applied on each column (or row) and a current collected on each row (or column) at said cross-point.

* * * * *